United States Patent

[11] 3,532,115

| [72] | Inventor | Elmer R. Hodil, Jr.<br>New Haven, Connecticut |
| --- | --- | --- |
| [21] | Appl. No. | 721,835 |
| [22] | Filed | April 16, 1968 |
| [45] | Patented | Oct. 6, 1970 |
| [73] | Assignee | Olin Mathieson Chemical Corporation<br>a corporation of Virginia |

[54] SHIELDED CHECK VALVE
2 Claims, 3 Drawing Figs.

[52] U.S. Cl. .................................................. 137/516.25,
                                                             251/332
[51] Int. Cl. .................................................. F16k 15/06
[50] Field of Search ........................................ 251/332;
                          137/516.25, 516.27, 516.29; 251/333

[56] References Cited
UNITED STATES PATENTS

| 2,179,165 | 11/1939 | Sifkovitz | 251/332 |
| 2,792,016 | 5/1957 | Shellman | 251/332 |
| 2,881,788 | 4/1959 | Johnson | 251/333 |
| 3,071,153 | 1/1963 | Cornelius | 137/516.29 |
| 2,272,351 | 2/1942 | Polcari | 251/333 |
| 2,851,243 | 9/1958 | Tannock | 251/332 |
| 2,960,998 | 11/1960 | Sinker | 251/333 |

Primary Examiner—William F. O'Dea
Assistant Examiner—William H. Wright
Attorneys—Donald R. Motsko, H. Samuel Kieser, William W. Jones, Richard S. Strickler, Robert H. Bachman and Thomas P. O'Day ABSTRACT: A check valve having a first valve head portion of comparatively resilient material and a second valve head portion of comparatively rigid material adjacent the first valve head portion.

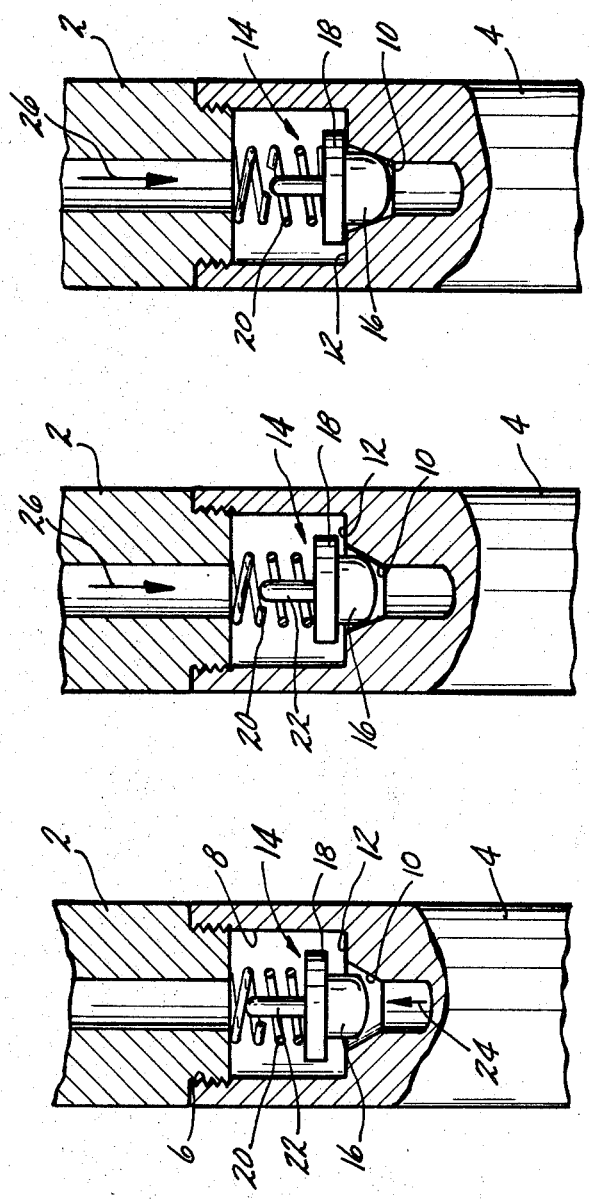
INVENTOR:
ELMER R. HODIL JR.

SHIELDED CHECK VALVE

This invention relates to a one-way check valve wherein the initial sealing surface on the valve head is protected from damage which could result from excessive sealing pressure exerted on the valve head.

It is generally old in the art to provide a check valve having a valve seat and a soft resilient valve head which is moved into sealing engagement with the valve seat when subjected to a predetermined amount of back pressure. The valve head is generally held open by the force of fluid pressure generated by fluid flowing through the valve in a predetermined direction. When a back pressure is developed in excess of a predetermined value, the valve head is moved against the valve seat into sealing engagement to prevent the fluid from flowing backward through the system. The sealing surface on the valve head is preferably composed of a soft pliable material in order that a fluid seal may be achieved without the development of excessive back pressure. The softer the valve head sealing surface is, the more sensitive the operation of the valve is, and the more easily the valve head is able to seal against a worn or chipped valve seat. Thus, in order to obtain a sensitive and fluid-tight check valve, it is preferable to provide a soft and resilient sealing surface on the valve head.

One disadvantage attendant to the use of a soft and resilient valve head sealing surface is that the sealing surface is easily damaged by cutting, scuffing, chewing, or the like, when the back pressure affecting a seal becomes too great. In many fluid systems, it is desirable to provide a check valve which can affect a checking of the backflow through the system at a very low pressure, but which at the same time can withstand ensuing higher back pressure which develop in the system after the initial closing of the check valve.

This invention provides a check valve which will check backflow at low pressures, and which will be undamaged by higher back pressures developing after the valve has closed. The check valve of this invention includes a valve head having an initial or primary sealing portion which is composed of a soft and pliable material, such as soft rubber, or a soft plastic. The valve head further includes a secondary sealing portion formed from a substantially harder or more rigid material such as hard rubber, a hard plastic or metal. The valve seat is so formed that the soft and pliable portion of the valve head contacts the valve seat to close the valve upon the development of a predetermined relatively minor back pressure, while at the same time, the harder portion of the valve head remains spaced apart from, and does not contact the valve seat. If the back pressure does not increase, the soft portion of the valve head provides the only seal against back flow of fluid through the valve, but if the back pressure does increase the soft portion of the valve head is deformed and flattened against the valve seat. As the soft portion flattens, the harder portion of the valve head is moved into contact with the valve seat to act as a barrier to protect the soft portion from further deformation. Thus, after a certain back pressure is reached, any further rise therein is directed against the hard portion of the valve head thereby saving the softer portion from damage induced by extreme back pressures.

It is, therefore, an object of this invention to provide a check valve wherein the primary sealing surface on the valve head is protected against damage from extreme back pressures.

It is a further object of this invention to provide a check valve which is capable of affecting a fluid-tight seal when acted upon by substantially minor back pressures.

It is yet another object of this invention to provide a valve head for use in a check valve, which valve head includes a comparatively soft and resilient sealing surface disposed adjacent to a comparatively hard sealing surface.

Other features, objects, and advantages of this invention will become apparent from the following detailed description and accompanying drawings, in which:

FIG. 1 is an elevated side view, partially in section, showing a check valve embodying features of this invention, wherein the valve is open to permit fluid flow in the system;

FIG. 2 is a view similar to FIG. 1 but showing the soft portion of the valve head in sealing engagement with the valve seat to prevent back flow through the system; and FIG. 3 is a view similar to FIG. 2 but showing the hard portion of the valve head in contact with the valve seat to protect the soft portion of the valve head from further deformation.

Referring now to FIG. 1, a portion of a fluid system is shown utilizing a check valve constructed in accordance with this invention. The system includes a pair of tubular conduits 2 and 4 which may be threadedly interconnected as at 6. The conduit 4 includes an enlarged bore 8 which serves as a valve housing. The bottom surface of the bore 8 serves as a valve seat which valve seat includes a central frusto-conical sector 10 and an annular generally planar marginal sector 12. The marginal sector 12 is shown as being planar, however, it is understood that it could be conical or any number of configurations without departing from the scope of the invention. A valve head, indicated generally by the numeral 14, is movably mounted in the bore 8. The valve head 14 includes a protruding portion 16 composed of soft natural rubber, neoprene, butyl rubber, or the like, and which is disposed opposite the frusto-conical portion 10 of the valve seat. The protruding portion 16 is a soft and relatively easily deformably member which forms an initial seal to check back flow of fluid through the system, as will be further explained hereinafter. It is noted, that the protruding portion 16 may be hollow or solid, and may be button-shaped, annular, or any number of different shapes without departing from the spirit of this invention. The valve head 14 further includes a disk-shaped portion 18 which is attached to the protruding portion 16 and which completely overlays the latter. The portion 18 is formed from a relatively hard material, such as hard rubber, hard plastic, or a corrosion resistant metal, such as stainless steel. It is noted that the disk 18 extends radially outwardly beyond the sides of the protruding portion 16, so as to include marginal portions disposed opposite the annual margin 12 of the valve seat. A compressible spring member 20 is mounted on the disk 18 and on the end wall of the conduit 2 to bias the valve head 14 toward the valve seat. By controlling the biasing force of the spring 20, one can control the fluid pressure at which the valve opens and closes. A spring guide 22 is preferably formed on the disk 18. As shown in FIG. 1, the valve is open to permit fluid to flow through the system in the direction of the arrow 24.

FIG. 2 shows the valve after the latter has closed in response to back pressure of fluid in the system, which back pressure is exerted in the direction of the arrow 26. The position of the valve head 14 as shown in FIG. 2 is induced by a relatively minor back pressure which is not sufficient to substantially deform the resilient protuberance 16, and yet which is sufficient to move the protuberance 16 into fluid sealing engagement with the frusto-conical surface 10 on the valve seat. It is noted that the rigid disk 18 is spaced apart from the marginal portion 12 of the valve seat.

In FIG. 3, the valve head 14 is shown in its shielded sealing position which occurs upon a greater development of back pressure in the direction of the arrow 26. As the back pressure increases, the protuberance 16 is deformed and compressed against the frusto-conical portion 10 of the valve seat. This compression permits the rigid disk 18 to move into sealing engagement with the marginal portion 12 of the valve seat. When the rigid disk 18 has moved into sealing engagement with the marginal portion 12 of the valve seat, as shown in FIG. 3, the protuberance 16 is shielded thereby against further deformation which would result from further increases in back pressure. Thus permanent damage to the resilient protruding portion 16 of the valve head 18 is prevented. Of course, the exact quantum of back pressure which will cause an initial sealing of the protuberance 16 against the frusto-conical portion 10 of the valve seat, and which will cause a sealing between the disk 18 and the marginal portion 12 of the valve seat will depend on various factors, for example, the biasing force of the spring 20 and the deformability of the protuberance 16. These factors can naturally be varied without departing from the spirit of the invention.

It is thus readily apparent that this invention provides a sensitive check valve having an initial sealing portion which is protected from damage resulting from surges of back pressure in a fluid system. The valve is simple and inexpensive to construct, and is readily adaptable for use in a variety of fluid systems.

Although reference has been made to a particular embodiment of the present invention, various modifications will readily suggest themselves to those skilled in the art and reference should be made to the appended claims to determine the scope of the invention.

I claim:

1. A check valve comprising:
   a. a valve seat having a marginal sector and a central recess consisting of a frusto-conical sector, said sectors meeting at a linear juncture;
   b. a movable valve head including:
      i. a rigid member having a face overlying said marginal sector of said valve seat; and
      ii. a relatively soft and pliable member centrally mounted on said rigid member and protruding from said face, said soft and pliable member being opposite said frusto-conical sector, and said soft, pliable member having a side wall inwardly offset from said linear juncture to prevent said soft, pliable member from contacting said marginal sector of said valve seat, said soft, pliable member being arranged for initial sealing engagement with said frusto-conical sector of said valve seat when said valve head is subjected to a predetermined lower pressure of fluid flowing in a first direction, and said rigid member being arranged for engagement with said marginal sector when said valve head is subjected to a predetermined higher pressure of fluid flowing in said first direction thereby protecting said soft, pliable member from excess deformation.

2. The check valve of claim 1, further comprising spring means to bias said valve head toward said valve seat.